UNITED STATES PATENT OFFICE.

LEBERECHT TRALLS, OF CHARLOTTENBURG, GERMANY, ASSIGNOR TO EDUARD BURMEISTER, OF HAMBURG, GERMANY.

PROCESS OF PURIFYING SEWAGE.

SPECIFICATION forming part of Letters Patent No. 693,316, dated February 11, 1902.

Application filed November 14, 1900. Serial No. 36,451. (No specimens.)

*To all whom it may concern:*

Be it known that I, LEBERECHT TRALLS, a citizen of the Empire of Germany, residing in Charlottenburg, Germany, have invented certain new and useful Improvements in Processes of Purifying Sewage, of which the following is a specification.

This invention relates to processes of purifying and disinfecting the sewage and liquid waste of towns and cities, so that the same when turned into adjacent rivers or streams does not pollute nor essentially injure the same. Many processes having this object in view have been heretofore proposed; but these efforts have not been attended in practice with entirely satisfactory results. Some while experimentally successful have been too costly for extended introduction and use.

Prominent among the different substances employed is slaked lime (calcium hydrate) either as a sole agent or for final clarification. This substance, however, has the disadvantage that when used alone the resulting precipitate requires a long time to settle, which renders the process extremely slow, and when used for clarifying the water is liable to quickly become putrid. I have, however, found that this substance may be used with great efficiency and highly-satisfactory results by adding first to the sewage liquid carbonate of lime and then adding an approximately equal quantity of the slaked lime, preferably agitating the mass during the addition of the slaked lime, or by adding to the sewage liquid a mixture of slaked lime and an approximately equal quantity of carbonate of lime, whereby a like result is obtained. The result is not attained when the slaked lime is first added and then the carbonate.

In carrying out this process a mixture of about equal quantities of calcium carbonate and calcium hydrate (slaked lime) is stirred into the sewage liquid, or the two substances may be separately stirred into the liquid, the carbonate being first stirred in and the hydrate immediately thereafter. No fixed quantity of these substances for a given volume of sewage can be stated, this being dependent on the condition of the sewage liquid. The amount to be added is in proportion to the pollution of the liquid and can be readily ascertained in each case by taking a small quantity of the waste liquid, adding to the same, little by little, a quantity of the substances named, and shaking the solution after each addition. So long as the quantity added is not in excess of that required a heavy flaky precipitate in large flakes settles quickly after each addition and agitation and the supernatant liquid quickly becomes quite clear. As soon, however, as the quantity added is in excess of that necessary the liquid does not clarify, but remains turbid for a long time. The proportion of the precipitating agents required for waste liquids of any degree of pollution can thus be easily determined. The carbonate of lime and slaked lime are used in approximately equal quantities.

Slaked lime (calcium hydrate) when exposed for a long time to the air absorbs a small quantity of carbonic-acid gas from the air, and there is thereby formed in the hydrate a small percentage of calcium carbonate; but in this mixture the carbonate is not present in any substantial quantity, and such lime does not produce the result attained by my process, but a result different therefrom and similar to that produced by freshly-slaked lime having no trace of carbonate, the unfavorable features of which have been hereinbefore referred to. For carrying out my process there is required hydrate of lime and therewith approximately an equal quantity of carbonate of lime. When these proportions are employed, the mixture will produce in the waste liquid treated a precipitate composed of large flakes and leaving the supernatant liquid clear.

The calcareous mud or precipitate formed by the treatment of a given quantity of sewage by my process may be used instead of fresh carbonate for treating a further quantity of sewage, as the result is the same.

From the large flakes of the precipitate and from the fact that the purification of the water is much more complete than with the use of calcium hydrate alone it will be clearly seen that the carbonate of lime does not produce a merely mechanical effect—*i. e.*, settling down more quickly, and thereby dragging with it the precipitate effected by the calcium hydrate. It is further evident that the process is not merely mechanical, from the fact that approximately the same result is obtained by first treating the sewage with carbonate of lime, while constantly stirring, allowing the precipitate to settle, and then drawing off the supernatant liquid into a second tank and treating it in the same with hydrate of lime.

By my improved process the disagreeable odor of the sewage is overcome and the water is so changed that it is not liable to putrefy, so that it can be immediately run into the rivers or adjacent streams, and thus disposed of.

Having thus described my invention, I claim as new and desire to secure by Letters Patent—

The process herein described of purifying sewage, which consists in adding to the same a mixture containing calcium carbonate and calcium hydrate in approximately equal proportions, in sufficient quantity, according to the pollution of the liquid, to produce in the same a heavy precipitate of large flakes leaving the supernatant liquid clear, substantially as set forth.

In testimony that I claim the foregoing as my invention I have signed my name in presence of two subscribing witnesses.

LEBERECHT TRALLS.

Witnesses:
LUDWIG VENGHÖFFER,
M. MERKWYS.